United States Patent [19]
Doddington et al.

[11] Patent Number: 5,222,187
[45] Date of Patent: Jun. 22, 1993

[54] GRAMMAR-BASED CHECKSUM CONSTRAINTS FOR HIGH PERFORMANCE SPEECH RECOGNITION CIRCUIT

[75] Inventors: George R. Doddington, Richardson; Charles T. Hemphill, Coppell, both of Tex.

[73] Assignee: Texas Instruments Incorporated, Dallas, Tex.

[21] Appl. No.: 458,860

[22] Filed: Dec. 29, 1989

[51] Int. Cl.$^5$ ............................................. G10L 9/00
[52] U.S. Cl. ....................................................... 395/2
[58] Field of Search ................................. 381/41–43, 381/51; 364/513.5; 371/65, 37, 39, 40; 395/2

[56] References Cited

U.S. PATENT DOCUMENTS

| | | | |
|---|---|---|---|
| 3,947,817 | 3/1976 | Requa et al. | 382/45 |
| 4,667,341 | 5/1987 | Watari | 381/41 |
| 4,872,201 | 10/1989 | Sakoe | 381/41 |
| 4,882,757 | 11/1989 | Fisher et al. | 381/43 |
| 4,984,178 | 1/1991 | Hemphill et al. | 381/43 |

OTHER PUBLICATIONS

"Total Voice Speaker Verification", by Davis, Hydrick and Doddington, Final Technical Report for Jul. 1976–May 1978, pp. 7–30.

*Primary Examiner*—Michael R. Fleming
*Assistant Examiner*—Michelle Doerrler
*Attorney, Agent, or Firm*—Pehr B. Jansson; Frank J. Kowalski; Leo N. Heiting

[57] ABSTRACT

A speech system recognizes words from a spoken phrase that conform to checksum constraints. Grammar rules are applied to hypothesize words according to the checksum constraints. The checksum associated with the phrase is thus inherent in the grammar. Sentences which do not meet a predetermined checksum constraint are not valid under the grammar rules and are therefore inherently rejected. The checksum constraints result in increased recognition accuracy.

32 Claims, 1 Drawing Sheet

GRAMMAR-BASED CHECKSUM CONSTRAINTS FOR HIGH PERFORMANCE SPEECH RECOGNITION CIRCUIT

TECHNICAL FIELD OF THE INVENTION

This invention relates in general to speech recognition, and more particularly to a grammar-based speech recognition circuit.

BACKGROUND OF THE INVENTION

Speech recognition is an imperfect art. Because of all the variables, including differences in microphones, speech accents, and speakers, abilities, it is not possible today to perform recognition of speech with the level of reliability that will satisfy the demands of many applications. There is a need, especially over the telephone, for higher performance speech recognition.

Speech recognition can be enhanced by constraining the words which may be recognized by the system to a small set, such as the set of ten digits from 0-9. Nevertheless, even with the set of ten digits, speaker independent speech recognition remains a difficult problem.

Speech recognition has recently been applied to access control. In any access or entry control system, two key functions are provided by the user: (1) user identification and (2) user verification. The user identification function allows a unknown user to provide a claimed identity. With a speech recognition device, the user may speak his identification code. The verification function is performed on a personal attribute of the user, for example, the user's voice characteristics. Thus, both the identification and verification functions are performed on the same spoken utterance.

Two benefits accrue from a speech recognition/speaker verification capability. First, verification time is reduced considerably, because the input speech data used for identification are also used for verification, thus completely eliminating the input time required for verification. Second, eliminating all but speech inputs provides operational advantages such as freeing hands, which allows the verification terminal to become less expensive and more mobile. In a voice communication system, other auxiliary sensing or verification devices may be eliminated.

In order to perform the identification function using a spoken identification code, speech recognition must be employed. Speech recognition translates the spoken words into a discrete identification code.

In order to provide a useful system, the speech recognition portion of the entry system must be speaker independent, i.e., able to translate the spoken code into words when the speaker is not yet known. Further, for broad application, it must be able to recognize words in connected speech, i.e., speech which does not have pauses between words. These requirements increase the difficulty in providing accurate speech recognition.

Therefore, a need has arisen in the industry to improve the performance of speech recognition systems.

SUMMARY OF THE INVENTION

In accordance with the present invention, a speech recognition method and apparatus of performing the same is provided which substantially eliminates or prevents the problems associated with prior speech recognition circuits.

In the present invention, speech is recognized from a sequence of spoken words which conform to one or more checksum constraints. Speech recognition is controlled by a grammar embedding the checksum constraints.

In an embodiment of the present invention, speech is recognized from a spoken phrase by hypothesizing words from the grammar. A grammar rule is applied to observed words resulting in a transition from a first state to a second state. The grammar is designed such that each state is indicative of a checksum value.

This embodiment of the present invention provides the technical advantage that checksum constraints are inherently provided for by the grammar rules, and therefore need not be computed. Furthermore, the present invention may be used with any finite-state grammar speech recognition system to augment its performance.

In an alternative embodiment, an unification grammar is used to apply the constraints. In this embodiment, the memory necessary to implement the constraint is minimized.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
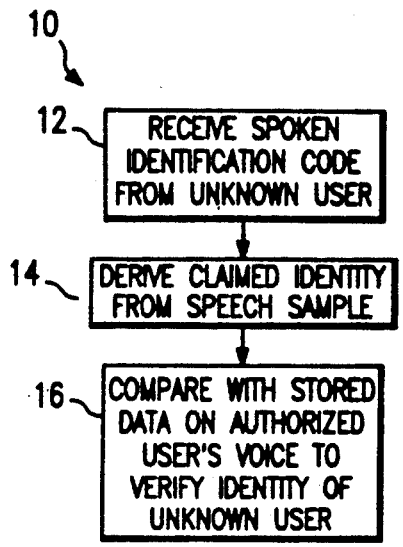
FIG. 1 illustrates a block diagram describing a total voice verification system.
Figure 2:
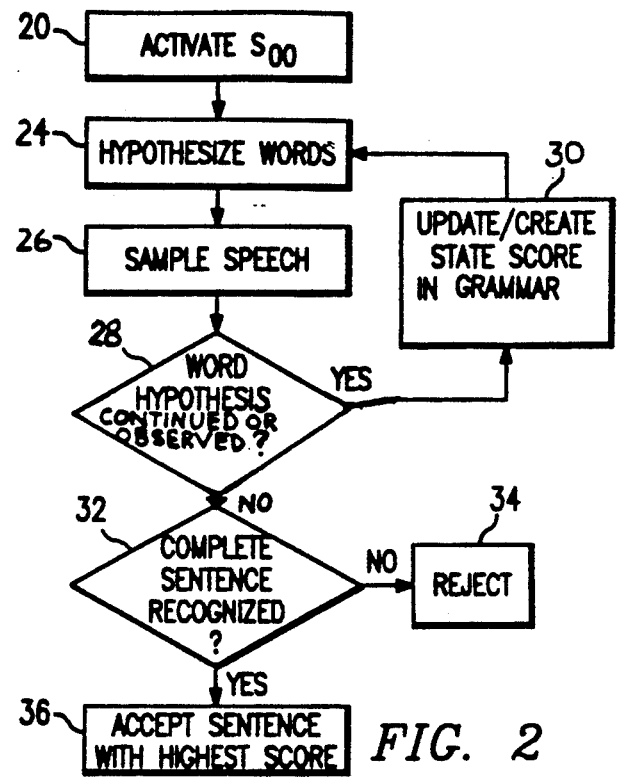
FIG. 2 illustrates a flow chart describing the speech recognition of the present invention.
Figure 3:
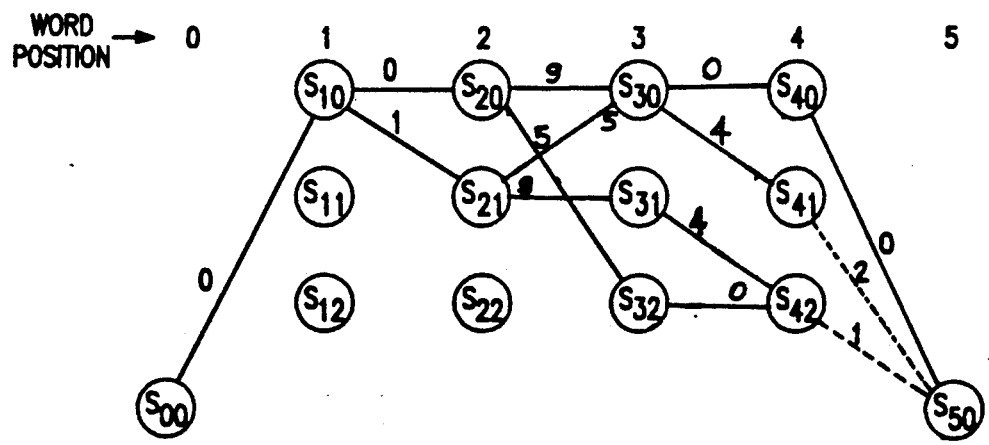
FIG. 3 illustrates a state diagram describing the network embodiment of checksums at each word position.

The preferred embodiment of the present invention is best understood by referring to FIGS. 1-3 of the drawings, like numerals being used for like and corresponding parts of the various drawings.

The goal of this invention is to improve speech recognition in the context of a conventional grammar-based speech recognition system by: 1) introducing constraints on the spoken utterance by imposing checksum constraints and 2) creating a conventional grammar with embedded checksum constraints to control the speech recognition. While the present invention is described in connection with a voice verification system, it may be applied to any speech recognition application.

FIG. 1 illustrates a block diagram describing the concept of speaker verification using voice recognition. In the flow chart 10, a spoken code is received in block 12 from an unknown user, i.e., a user whose identity has not been validated. In block 14, a claimed identity is derived from the speech sample. The claimed identity is determined by translating the spoken code into discrete words which form a unique identification code. A proper identity code corresponds to one of a set of authorized users. In block 16, the identification code is used to retrieve stored data on the corresponding authorized user's voice pattern to verify the identity of the unknown person. The verification is performed by comparing the stored speech data with the spoken code received in block 12.

To enroll, an authorized user submits a unique phrase which will become part of his identification code. For purposes of illustration, it will be assumed that the phrase is composed of the digits 0-9, although this restriction is not necessary for the present invention. For example, the phrase entered by the user may be his or her telephone number or social security number.

Checksum words are computed and added to the phrase such that the total phrase is forced to a predetermined checksum. For example, if the entered phrase is "01500" and the predetermined checksum for each (five digit) phrase in the system is set to zero for a modulus of three, then the system will compute a "0" as the checksum word to satisfy the formula set forth below:

$$\left( \sum_{i=1}^{n} d_i \right) \mod k = 0$$

where
n = number of words in total phrase (equal to five in example)
k = modulus (equal to three in example)
$d_i$ = word at position i It should be noted that more complex checksum algorithms could be used with the present invention, and that the system may compute more than one checksum word for the phrase. Generally, it is desirable to use a large modulus, and preferably, a prime number. For example, modula such as "23" and "29" are generally suitable.

Alternatively, an identification phrase which meets the checksum constraints may be selected for the user without his involvement.

The phrase, which is the authorized user's identification code, is spoken by the user and stored as a template which may be used to verify the speaker's identity. A system for verification is disclosed in Naik et al. U.S. Pat. No. 5,054,083, entitled "Voice Verification Circuit for Validating the Identity of Telephone Calling Card Customers," which is incorporated by reference herein.

Referring to FIGS. 2 and 3, a first embodiment of the speech recognition system of the present invention is illustrated. FIG. 2 illustrates a flow chart of the speech recognition process of the present invention. It is noted that the speech recognition system will compute several hypothesized phrases simultaneously for each spoken identity code. For example, if the spoken identification code is "01500," the system will normally track several hypothesized phrases, depending upon the user's pronunciation of the identification code. In addition to "01500", the system may track, for example, "01941," "00942," and "00501" as being possibilities for the spoken phrase. This aspect of the invention is illustrated in connection with FIG. 3.

In a finite-state automaton (for the purposes of this specification, "grammar" is used to refer to both automata and grammars), a predetermined number of states are defined. This is shown graphically in FIG. 3, wherein fourteen possible states are shown, including the initial state ($S_{00}$) and final state ($S_{50}$). A set of rules determines the transition from one state (the "source" state) to another state (the "destination" state), based on the observation of a word.

Referring to FIG. 2, the initial state, $S_{00}$, is activated in block 20. In block 24, words are hypothesized and the spoken identification code is sampled in block 26. One such system for hypothesizing words is disclosed in Hemphill et al. U.S. Pat. No. 4,984,178, entitled "Chart Parser for Stochastic Unification Grammar", which is incorporated by reference herein, but other systems could be used as well.

In decision block 28, it is determined whether a word may be observed from the sample speech, i.e., whether the hypothesis has finished. If a word is observed in decision block 28, then the finite-state automaton transitions are applied to determine the destination state based on the observed word in block 30. Each observed word is given a score, or value, indicative of its correlation with the sampled speech. If two hypothesized phrases each activate the same state, the phrase with the higher score is maintained, while the phrase with the lower score is rejected. After activating the state or updating the state's score, hypothesizing words and sampling the speech in blocks 24 and 26 continues until the end of the utterance. In decision block 32, it is determined whether a complete sentence, or sequence, is recognized. As will be shown in greater detail in connection with FIG. 3, only sentences meeting the checksum constraints are valid under the finite-state automaton. Those which do not meet the checksum constraints are never hypothesized in block 24. If more than one hypothesized sentence is completed in decision block 32, then the sentence with the highest score is accepted in block 36.

FIG. 3 illustrates a state diagram depicting operation of the flow chart of FIG. 3, but ignoring word boundary uncertainties. FIG. 3 illustrates an example where four phrases are hypothesized, "01500," "01941", "00942", and "00501," using a checksum of modulus 3. State $S_{00}$ represents the initial state. At word position "1", a "0" has been determined as the first observed word. In this instance, the "0" was clear enough that no other words were observed. The finite-state automaton transitions dictate that from $S_{00}$, a hypothesized word of "0" causes a transition to $S_{10}$ (the first subscript representing the word position and the second subscript representing the checksum). Hence, the checksum of the phrase at word position "1" is determined by the finite-state automaton without any calculation. From word position "1" to word position "2", two words are observed, a "0" and a "1"; the first observed word ("0") causes a transition from $S_{10}$ to $S_{20}$ and the second observed word causes a transition from $S_{10}$ to $S_{21}$. From word position "2" to word position "3", two words are observed, a "9" and a "5". The observed "9" results in a transition from $S_{20}$ to $S_{30}$ and a transition from $S_{21}$ to $S_{31}$. The observed "5" results in a transition from $S_{20}$ to $S_{32}$ and a transition from $S_{21}$ to $S_{30}$.

From word position 3 to word position 4, a "4" is observed from $S_{20}$ resulting in a transition to $S_{41}$. From $S_{31}$, a "4" is observed, resulting in a transition from $S_{31}$ to $S_{42}$. From $S_{30}$, a "0" is observed, resulting in a transition from $S_{30}$ to $S_{40}$. From $S_{32}$, a "0" is observed resulting in a transition from $S_{32}$ to $S_{42}$.

In this instance, the observed words result in two states, $S_{31}$ and $S_{32}$, having a transition to the same state, $S_{42}$. The phrase with the highest score would be chosen for continued hypothesizing while the weaker score would be rejected.

From word position 4 to word position 5, a "0" is observed. Only $S_{40}$ will render a complete sentence, i.e., result in a transition to $S_{50}$. The other active states, $S_{41}$ and $S_{42}$, require observations of 2, 5 and 8 or 1, 4 and 7, respectively, to result in a transition to $S_{50}$ using the finite-state grammar rules. Hence, only one hypothesized phrase meets the finite-state grammar rules for a sentence, thereby inherently meeting the checksum constraints.

An alternative embodiment of the present invention uses an unification grammar, which adds "logical variables" to allow context from one part of a grammar rule to affect subsequent processing of the remainder of a rule. An example of the unification grammar which constrains a sequence of five digits by a checksum is illustrated below using the Definite Clause Grammar dialect of the Prolog programming language:

```
number(CHK) ——>
    digit(D1), {chk(D1, CHK1)},
    digit(D2), {Sum2 is CHK1 + D2, chk(Sum2, CHK2)},
    digit(D3), {Sum3 is CHK2 + D3, chk(Sum3, CHK3)},
    digit(D4), {Sum4 is CHK3 + D4, chk(Sum4, CHK)},
    digit(CHK).

digit(0) ——>[zero].
digit(0) ——>[oh].
digit(1) ——>[one].
digit(2) ——>[two].
digit(3) ——>[three].
digit(4) ——>[four].
digit(5) ——>[five].
digit(6) ——>[six].
digit(7) ——>[seven].
digit(8) ——>[eight].
digit(9) ——>[nine].

chk(Sum, CHK) :—
    CHK is Sum mod 3.
```

The rules in the program constitute the entire checksum grammar; independent of the checksum modulus. These rules expand during the recognition process to cover exactly that subset of the original finite-state automata needed for a particular utterance. The rules expand by a mechanism called "instantiation." For example, the variable D1 in the first rule might instantiate to any of the digits "0"–"9." Next, the instantiated value of D1 must satisfy the predicate (shown within the braces), i.e., chk(D1, CHK1), where chk(Sum, CHK) defines CHK as equal to Sum mod 3. Hence, if variable D1 equals "0", the predicate equals 0(since 0 mod 3=0). Hence, CHK1 equals 0.

For each digit, separate rule hypotheses can merge, if they contain the same intermediate checksum value. The final checksum from the Sum4 variable for each surviving set of instantiations is compared to the final digit to determine whether the checksum constraint has been met. It is instructive to trace through the previous example with this grammar.

The of unification provide the technical advantage of efficiently supporting encoding of context, thus reducing the memory requirements. The reduced memory requirement, however, is offset by the need to perform calculations during processing, which is not necessary using the Finite State Automata.

It should be noted that the present invention may be used with other grammars, such as a context free grammar. It should also be noted that the present invention may be used with any set of words and need not be constrained to digits only. Grammar rules could be applied to any set of words such that the rules embody a checksum.

Although the present invention has been described in detail, it should be understood that various changes, substitutions and alterations can be made herein without departing from the spirit and scope of the invention as defined by the appended claims.

What is claimed is:

1. A method of recognizing speech comprising the steps of:
   receiving spoken input;
   observing words from said spoken input;
   conforming a sequence of said observed words to one or more checksum constraints; and
   recognizing said conformed sequence by controlling such speech recognition with a grammar embedding said checksum constraints.

2. The method of claim 1 wherein said recognizing step includes the steps of:
   hypothesizing words from said spoken input to form a hypothesized phrase; and
   applying a grammar rule to said hypothesized words, said grammar rule operable to implement a checksum constraint on the hypothesized phrase.

3. The method of claim 2 wherein each hypothesized word comprises a number.

4. The method of claim 2 wherein said step of applying includes the step of applying a grammar rule associated with a first state and with said hypothesized words such that a second state is determined, said second state indicative of a checksum value.

5. The method of claim 2 and further comprising the step of computing a probability for each hypothesized word to aid implementation of said checksum constraint on said hypothesized phrase.

6. The method of claim 1 wherein said controlling step comprises the step of controlling the speech recognition using a finite-state automaton embedding said checksum constraints.

7. The method of claim 1 wherein said controlling step comprises the step of controlling the speech recognition using a unification grammar embedding said checksum constraints.

8. Circuitry for recognizing speech comprising:
   circuitry for receiving spoken input;
   circuitry for observing words from said spoken input;
   circuitry for conforming a sequence of said observed words to one or more checksum constraints; and
   circuitry for recognizing said conformed sequence by controlling such speech recognition with a grammar embedding said checksum constraints.

9. The circuitry of claim 8 wherein said recognizing circuitry comprises:
   circuitry for hypothesizing words from said spoken input to form a hypothesized phrase; and
   circuitry for applying a grammar rule to said hypothesized words operable to implement a checksum constraint on the hypothesized phrase.

10. The circuitry of claim 9 wherein said circuitry for hypothesizing words comprises circuitry for hypothesizing numbers.

11. The circuitry of claim 9 wherein said applying circuitry comprises circuitry for applying a grammar rule associated with a first state and with an observed word such that a second state is determined, said second state indicative of a checksum value.

12. The circuitry of claim 9 and further comprising circuitry for computing a probability for each hypothesized work to aid implementation of said checksum constraint on said hypothesized phrase.

13. The circuitry of claim 8 wherein said controlling circuitry comprisess circuitry for controlling the speech recognition using a finite-state grammar embedding said checksum constraints.

14. The circuitry of claim 8 wherein said controlling circuitry comprises circuitry for controlling the speech recognition using a unification grammar embedding said constraints.

15. A method of recognizing speech from a spoken phrase comprising a plurality of words in a grammar-based system, comprising the steps of:
receiving said spoken phrase;
activating a first state;
hypothesizing a word from the spoken phrase;
applying a grammar rule associated with said first state to said hypothesized word and an observed word such that a second state is determined, said second state indicative of a checksum value; and
recognizing speech by controlling such speech recognition with a grammar embedding checksum constraints which employ said checksum value.

16. The method of claim 15 wherein each hypothesized word comprises a number.

17. The method of claim 15 and further comprising the steps of:
repeating said steps of hypothesizing and applying until the end of the spoken phrase is reached, wherein said steps of hypothesizing words and applying associated grammar rules thereto are performed in order to determine states associated with a next word position and respective of said hypothesized words.

18. The method of claim 17 and further comprising the step of computing a probability for each hypothesized phrase to aid in said step of recognizing speech.

19. The method of claim 18 and further comprising activating each of said determined successive states after applying the grammar rule.

20. The method of claim 19 and further comprising the step of comparing the probabilities of hypothetical phrases when a determined state has previously been activated in conjunction with another hypothesized phrase.

21. The method of claim 15 wherein said step of hypothesizing further comprises hypothesizing phrases of successive said hypothesized words from said spoken phrase; and
said step of applying further comprises applying grammar rules to each of said successive hypothesized words to determine successive states associated with successive word positions, each successive state indicative of a checksum value.

22. The method of claim 21 wherein each hypothesized phrase comprises a plurality of numbers.

23. The method of claim 15 and further comprising the step of computing a probability for each hypothesized word to aid in said step of recognizing speech.

24. The method of claim 15 wherein said grammar rules comprise finite-state automaton transitions.

25. The method of claim 15 wherein said grammar rules comprise unification grammar rules.

26. Circuitry for recognizing speech from a spoken phrase comprising a plurality of words, comprising:
circuitry for hypothesizing words from the spoken phrase;
circuitry for applying grammar rules to determine a transition from a source state to a destination state responsive to a hypothesized word, such that a checksum may be determined from said destination state; and
circuitry for recognizing speech by controlling such speech recognition with a grammar embedding checksum constraints by employing said checksum.

27. The circuitry of claim 26 wherein each hypothesized work comprises a number.

28. The circuitry of claim 26 wherein each state is associated with a work position within a hypothesized phrase comprised of successive hypothesized words and a checksum value for the hypothesized phrase.

29. The circuitry of claim 28 wherein said hypothesizing circuitry is operable to hypothesize a plurality of hypothesized phrases for each spoken phrase.

30. The circuitry of claim 29 and further comprising circuitry for computing a probability for each hypothesized work to aid said circuitry for recognizing speech.

31. The circuitry of claim 30 and further comprising circuitry for computing a probability for each hypothesized phrase to aid said circuitry for recognizing speech.

32. The circuitry of claim 29 and further comprising circuitry for computing a probabilities of hypothetical phrases having a common destination state to aid said circuitry for recognizing speech.

* * * * *